(12) United States Patent
Blumenthal et al.

(10) Patent No.: US 9,385,814 B2
(45) Date of Patent: Jul. 5, 2016

(54) WAVELENGTH TUNABLE ARRAY FOR DATA COMMUNICATIONS

(71) Applicant: Packet Photonics, Inc., Santa Barbara, CA (US)

(72) Inventors: Daniel Jacob Blumenthal, Santa Barbara, CA (US); Henrik N. Poulsen, Santa Barbara, CA (US)

(73) Assignee: OE SOLUTIONS AMERICA, INC., Englewood Cliffs, NJ (US)

( * ) Notice: Subject to any disclaimer, the term of this patent is extended or adjusted under 35 U.S.C. 154(b) by 22 days.

(21) Appl. No.: 13/895,745

(22) Filed: May 16, 2013

(65) Prior Publication Data
US 2013/0308951 A1    Nov. 21, 2013

Related U.S. Application Data

(60) Provisional application No. 61/647,522, filed on May 16, 2012.

(51) Int. Cl.
*H04B 10/00*        (2013.01)
*H04B 10/40*        (2013.01)
(Continued)

(52) U.S. Cl.
CPC .............. *H04B 10/40* (2013.01); *G02B 6/4246* (2013.01); *H04B 10/506* (2013.01); *H04J 14/02* (2013.01); *H04J 14/021* (2013.01)

(58) Field of Classification Search
CPC ....... G02B 6/4246; H04B 10/40; H04J 14/02; H04J 14/021
USPC .................................................... 398/83, 135
See application file for complete search history.

(56) References Cited

U.S. PATENT DOCUMENTS

| 5,864,415 A | 1/1999 | Williams et al. |
| 6,411,412 B1 | 6/2002 | Jiang et al. |

(Continued)

FOREIGN PATENT DOCUMENTS

| EP | 1432152 | 6/2004 |
| WO | 2008010866 | 1/2008 |

OTHER PUBLICATIONS

PCT International Search Report and Written Opinion for PCT/US2013/041409; mailed Aug. 28, 2013; 11 pages.

(Continued)

*Primary Examiner* — Danny Leung
(74) *Attorney, Agent, or Firm* — Karish & Bjorgum, PC

(57) ABSTRACT

Systems and apparatus for data communications comprising a plurality of wavelength tunable submodules in an array is provided. Each submodule has a wavelength tunable laser, and each submodule comprises, as an individual unit, a self-contained wavelength locker having optical and/or optoelectronic functions. The system may be a transponder array comprising a plurality of WDM or DWDM modules. In some embodiments, the individual submodules may comprise photonic integrated wavelength tunable lasers with other optical, electrical and optoelectronic components. Each wavelength tunable submodule incorporated into the module or array can have the same or different optical wavelength and other parameters including but not limited to modulation format. By utilizing the wavelength tunable laser submodules to build a module or array, the need for individual modules dedicated to wavelength sub-bands in the array is eliminated. The same tunable module can be used to fill all the wavelengths on a transmission fiber.

12 Claims, 6 Drawing Sheets

(51) Int. Cl.
*G02B 6/42* (2006.01)
*H04J 14/02* (2006.01)
*H04B 10/50* (2013.01)

(56) References Cited

U.S. PATENT DOCUMENTS

| | | | |
|---|---|---|---|
| 6,845,108 B1 | 1/2005 | Liu et al. | |
| 6,868,100 B2 * | 3/2005 | Larson | H01S 5/06256 372/20 |
| 6,931,175 B2 | 8/2005 | Bock et al. | |
| 6,972,907 B2 | 12/2005 | Kozlovsky et al. | |
| 7,221,820 B2 * | 5/2007 | Boertjes | H04B 10/2513 385/24 |
| 7,298,974 B2 | 11/2007 | Tanobe et al. | |
| 7,539,369 B2 | 5/2009 | Yamazaki | |
| 7,570,844 B2 | 8/2009 | Handelman | |
| 7,590,354 B2 | 9/2009 | Sauer et al. | |
| 7,609,971 B1 * | 10/2009 | Zhou | H01Q 25/00 342/375 |
| 7,801,445 B2 | 9/2010 | Bai et al. | |
| 8,019,225 B2 | 9/2011 | Daghighian et al. | |
| 8,472,805 B2 * | 6/2013 | Lam | H04J 14/0279 398/196 |
| 9,225,423 B1 * | 12/2015 | Charbonneau-Lefort | H04B 10/40 |
| 2002/0171890 A1 * | 11/2002 | Lin | H04J 14/0212 398/83 |
| 2003/1122836 | 6/2003 | Kim et al. | |
| 2005/0281558 A1 | 12/2005 | Wang et al. | |
| 2006/0133804 A1 | 6/2006 | Boduch et al. | |
| 2007/0092248 A1 * | 4/2007 | Jennen | H04J 14/021 398/45 |
| 2007/0264020 A1 | 11/2007 | Li et al. | |
| 2008/0193133 A1 | 8/2008 | Krug et al. | |
| 2008/0205887 A1 * | 8/2008 | Murano | H04B 10/675 398/48 |
| 2009/0154917 A1 | 6/2009 | Handelman | |
| 2009/0162051 A1 * | 6/2009 | Hudgins | H04B 10/40 398/9 |
| 2009/0226168 A1 | 9/2009 | Boduch | |
| 2010/0021166 A1 | 1/2010 | Way | |
| 2010/0034535 A1 * | 2/2010 | Guignard | H04Q 11/0067 398/25 |
| 2010/0142961 A1 | 6/2010 | Wisseman | |
| 2010/0290790 A1 | 11/2010 | Murthy et al. | |
| 2010/0322632 A1 | 12/2010 | Way | |
| 2011/0013911 A1 | 1/2011 | Alexander et al. | |
| 2011/0097083 A1 | 4/2011 | Barrett | |
| 2011/0135301 A1 | 6/2011 | Myslinski et al. | |
| 2011/0158642 A1 | 6/2011 | Barnard et al. | |
| 2011/0158653 A1 * | 6/2011 | Mazed | H04B 10/272 398/140 |
| 2011/0170880 A1 | 7/2011 | Daghighian et al. | |
| 2011/0229129 A1 | 9/2011 | Hu et al. | |
| 2011/0243552 A1 | 10/2011 | Mitchell et al. | |
| 2011/0292953 A1 * | 12/2011 | Liu | H01S 5/06256 372/20 |
| 2012/0033969 A1 * | 2/2012 | Sakauchi | G02B 6/2932 398/48 |
| 2012/0082458 A1 | 4/2012 | Bouda et al. | |
| 2012/0155882 A1 | 6/2012 | Sheth et al. | |
| 2013/0308951 A1 * | 11/2013 | Blumenthal | H04J 14/02 398/83 |

OTHER PUBLICATIONS

Supplemental European Search Report, dated Jan. 28, 2016.

* cited by examiner

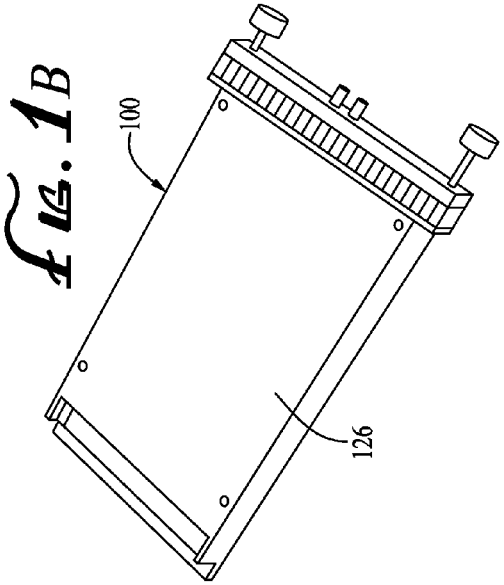
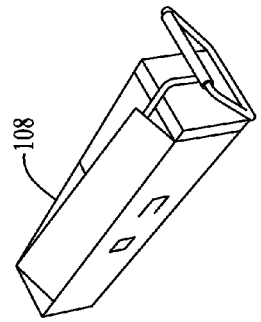
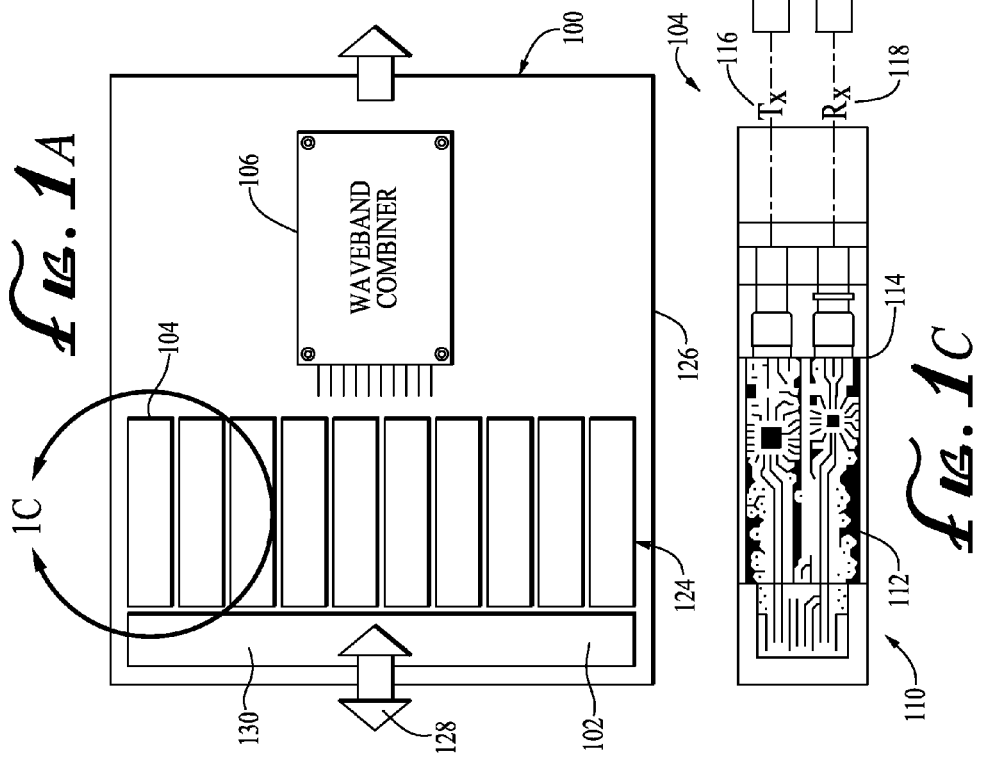

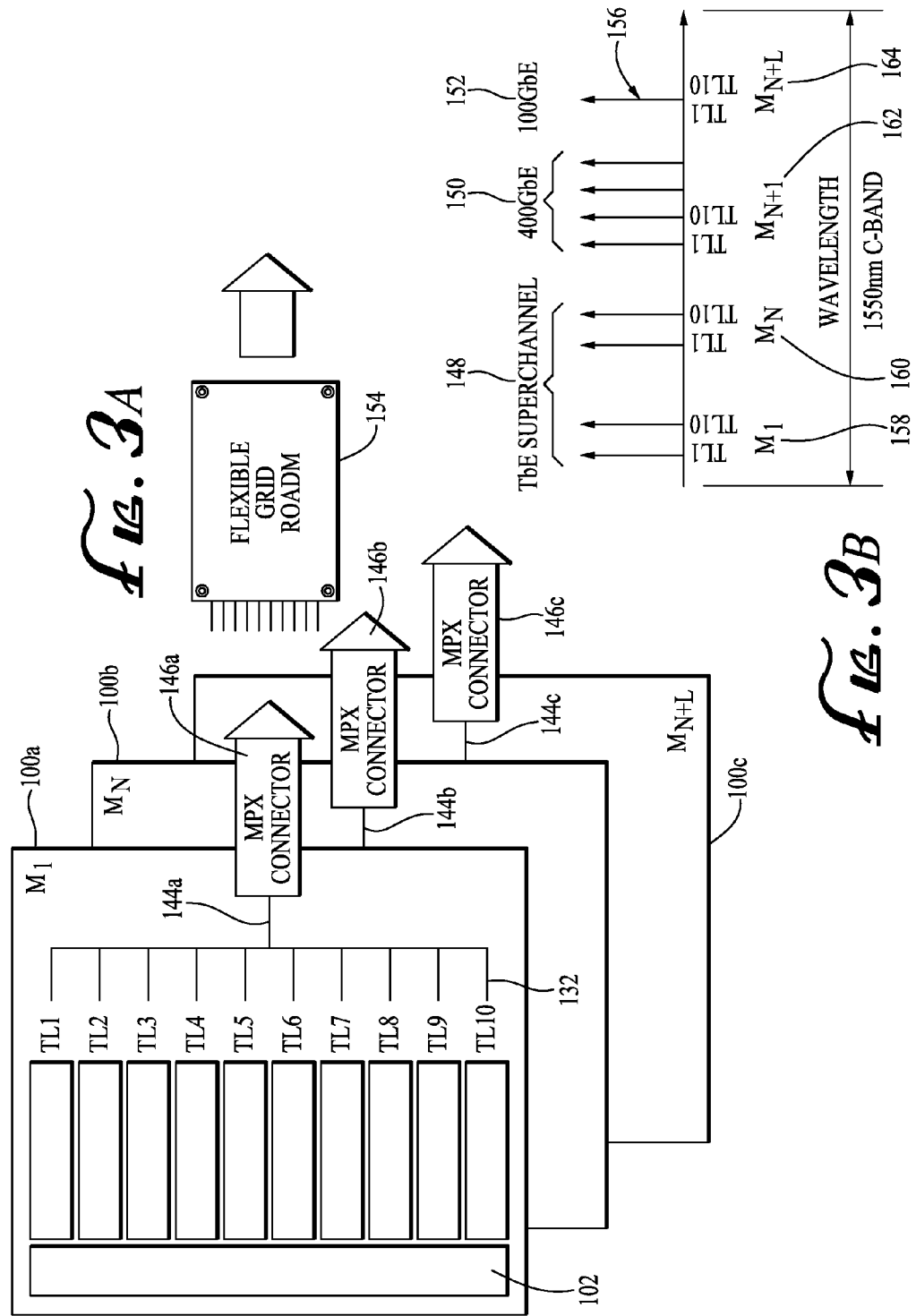

WAVELENGTH TUNABLE ARRAY FOR DATA COMMUNICATIONS

CROSS-REFERENCE TO RELATED APPLICATIONS

This application claims the benefit of U.S. Provisional Patent Application No. 61/647,522 filed May, 16 2012, the contents of which is incorporated herein by reference in its entirety.

BACKGROUND

Today's fiber optic based networks use transceivers at the interface between electronics and the optical signals that propagate on the optical fiber. A transceiver is generally used to convert between electronic data and optical signals that are transmitted via an optical fiber. A transceiver contains within it the basic elements of an optical transmitter (laser, modulator, laser drive electronics, data drive electronics, sometimes temperature stabilization, data interfacing and control electronics and I/O interfacing, etc.) an optical receiver (photodetector, detector amplifier, possibly data and clock recovery, data and control electronics and I/O, and depending on application requirements and design specifications other electronics to perform physical layer protocol functions as well as functions to control these components. There are many applications for transceivers ranging from fiber to the home, to data centers to long haul and high-performance communications. The performance of the transceiver as well as its cost is tied to the particular application.

Today, most transceivers are manufactured in a pluggable form factor that can be installed and removed from a linecard or system without turning on and off the system power and allow the transceiver to be inserted and removed from a card cage slot. The pluggable modules often conform to a standard, like an XFP, QSFP+ or SFP package, and most recently CFP package, that includes electrical, optical and mechanical, or power dissipation/usage as well other factors that enable a modules to be purchased from different vendors to meet the needs of customers using these pluggables. However, non-standard form factors can also be implemented as well as construction of the transceiver directly on printed circuit cards, line cards, daughter cards or other form factor. Prior art array transceivers, including QSFP+ and CFP form factors, incorporate multiple transmitters and receivers in one package, each transmitting and receiving at a specified data rate. Those skilled in the art are familiar with the most common data rate per channel for arrayed transceivers are 2.5 Gbps, 10 Gbps 25 Gbps or other multiples used in the telecom or data communication industries or 1 Gpbs, 2 Gbps, 5 Gbps for other applications, are among the many examples. The lasers inside the arrayed transceiver are generally chosen for a particular application, for example for transmission over fiber lengths of 0 to several hundred meters will utilize VCSEL laser technology and VCSEL transceiver arrays are commonly used in large volume applications like communications within data centers.

Various designs that can be used in the fiber input/output of the transceiver array include a-fiber ribbon, with each fiber connected to each of the transmitters and receivers inside the arrayed pluggable. In this case, each laser in the array can be operating at the same optical wavelength (typically 830 nm or 1310 nm for short reach fiber distances), or the array may contain wavelength division multiplexing (WDM) where each transmitter emits light at a different wavelength. In the case of today's QSFP+ package, 4×10 Gbps channels are incorporated. Those skilled in the art are aware of standards for these various configurations described above, and other configurations that have been standardized. For short reach distances, less than 100 m, normally multimode fiber is used and the lasers operate at 830 nm, and a ribbon cable is used to connect to four transceivers within the QSFP+ pluggable. Those skilled in the art will be familiar with other designs and standards that support lasers each operating at the same 1310 nm, in which case there are ribbon fiber connectors for the input/outputs for each transceiver. In the WDM version, at 1310 nm, each laser is operating at a wavelength in the 1310 nm waveband, where the wavelengths have been set by standards bodies and multiple configurations can be used. For example, a ribbon fiber connecting the pluggable with a 1310 nm wavelength multiplexer/demultiplexer outside the QSFP+ package, multiplex/demultiplexes the wavelengths to/from a single fiber, or the wavelength multiplexer/demultiplexer is built into the package with only a single transmit and receive fiber connector interfaced to the package instead of a fiber array. In the later case of a 1310 nm configuration, a single mode fiber (SMF) is typically used.

Another recent form factor that supports arrayed transceivers is the CFP, a module that today contains 10×10 Gbps transceivers. The CFP, as with the QSFP+, can contain ten 830 nm VCSEL based transceivers connected to a ribbon connector at the CFP output to communicate over multi-mode fiber (MMF) at distances up to 100 m and sometimes 300 m. The CFP like the QSFP+ can also contain, for fiber distances from 100 m to 2 km or 10 km, identical 1310 nm transceivers connected to a ribbon for shorter distances (e.g. up to 300 m) or use the standardized 1310 nm 10 wavelength grid (as opposed to the 4 wavelength grid for the 40 Gps QSFP+ modules) that are multiplexed/demultiplexed, either internal to the CFP module or external.

For longer range transmission, fibers are today a scarcer commodity than in short reach transmission (e.g. under 2 km), although this can change in the future. To utilize as much bandwidth in the single fiber as possible, dense WDM (DWDM) is used with 1550 nm lasers operating with today, a channel spacing of 100 GHz according to the standard ITU grid. The CFP arrayed modules, for example, today contain arrays of fixed wavelength externally modulated lasers, most often using Distributed Feedback (DFB) WDM lasers, one wavelength for each channel inside the CFP. In order to fill up the bandwidth of a fiber, today's links are using 40 channels with 100 GHz spacing, which yields 400 Gbps per fiber, or 80 channels with wavelength spaced by 50 GHz for 800 Gbps, and higher capacities are used with more channels. Since the DFB lasers are fixed, a dedicated array of transceivers is needed for each set of channels per pluggable, for example 10 fixed wavelengths per 10 channel CFP. A dedicated CFP is then needed for each of the 10 channels, for example channels 1-10, 11-20, etc. This locks down the ability to use an array module to communicate on an arbitrary set of wavelengths or wavelength group and leads to many issues including the sparing problem, where a backup pluggable or array transceiver is needed to support each set of wavelengths. Additionally, the wavelengths output from each arrayed transceiver are fixed in the output wavelengths and therefore a client side electrical connection must be electrically rewired or switched to a different transceiver port to be transmitted over a desired wavelength or a desired group of wavelengths. This current use of fixed wavelength arrayed transceivers leads to cost inefficiencies in number of parts, parts tracking, sparing, and the ability to dynamically configure the output wavelength or group of wavelengths based on the connection or transmission needs of the network.

There is demand to push the fiber capacity to 1 Terabit per sec (Tbps) and beyond, so people are looking at DFB lasers that can operated on densely spaced optical frequency grids including 50 GHz grid, 25 Ghz grid, or narrower, integration of the laser with an external modulator for cost efficiency and power and space efficiency, and techniques that allow more data to be encoded on a given wavelength grid spacing including coherently optical modulation. One skilled in the art recognizes that while there are standards to operate systems at 50 GHz and 25 GHz grid spacing using incoherent or coherent coding, dedicated transceivers (non-arrayed) are typically used to reach this level of performance or in certain cases at the 1550 nm waveband, multiple fixed wavelength DFB lasers each designed to operate at a different optical frequency are used as a multi-wavelength array. Commercial arrayed transceivers today are of a fixed transmission wavelength only and do not afford the many benefits and advantages afforded by an array of tunable lasers transceiver. Examples of arrayed WDM transceivers available today include 4×25 Gbps fixed wavelength wavelength division multiplexed QSFP+ and CFP/2 or CFP/4 form factors, typically in the 1310 nm waveband and 10 channel fixed wavelength 100 Gbps 10 channel×10 Gbps transceivers employing fixed wavelength lasers some with and some without integrated optical data modulators. Other types of deployed arrayed transceivers use fixed wavelength lasers with coherent modulators. The CFP/2 and CFP/4 form factors refer to, as of yet, unstandardized small versions of the CFP form factor (½ width and ¼ width respectively), there are multiple efforts to standardize these form factors and other form factors continue to enter the market, however, all arrayed transceivers utilizing fixed wavelength laser.

Typically transceiver arrays are used to transmit aggregate data that has been converted to a parallel transmission format. This is the case where 100 Gbps Ethernet is transmitted over 10×10 Gbps wavelength channels, or 4×25 Gbps wavelength channels. These transceivers generally do not allow the flexibility to choose between aggregate transmission using all lasers or using each laser independently or subgroups of wavelengths in the arrayed transceiver for flexible parallel transmission.

Lastly, there is a current movement by several carriers and vendors to utilize not only a fixed wavelength grid but a flexible wavelength grid (discretized at some base spacing like 37.5 GHz) but allowing discretely arbitrary combinations of grids, modulation formats and channelization over the same fiber to co-exist in a flexible manner. This flexible grid concept will require new technology, components and system innovation, one example being a flexible grid reconfigurable optical add/drop multiplexer (Flex-ROADM) that is being introduced by several manufacturers. One example of a modulation format that can take advantage of a flexible grid, and is familiar to those skilled in the art, is the "superchannel" that places the wavelengths very close together to operate as a single transmission channel in order to send 1 Tbps and higher. This type of transmission requires filtering (multiplxing/demultiplexing) that is different than conventional DWDM or WDM transmission. See, e.g., "DWDM transmission at 10 Gb/s and 40 Gb/s using 25 GHz grid and flexible-bandwidth ROADM," M. Filer and S. Tibuleac, National Fiber Optic Engineers Conference, Los Angeles, Calif., Mar. 6, 2011, Optical Switching and Nonlinear Management paper NThB.

There are several disadvantages and shortcomings of today's state of the art transceiver arrays and modules including, for example, today's arrayed 100 Gbps 10×10 Gps CFP modules utilize DFB lasers that are fixed in wavelength and todays 4×25 Gbps QSFP+ transceivers use 4 fixed wavelength lasers. The use of fixed wavelength lasers in each module results in CFP (or QSFP+ or any other arrayed module) to be built as fixed sub-bands, for example a module for wavelengths 1-10, a module for wavelengths 11-20, etc for dense wavelength division multiplexing, or as course wavelength division multiplexed links where for example the 4 25 Gbps channels, each on a different fixed wavelength in the 1310 nm waveband, are the only 4 wavelengths on the fiber. This use of fixed wavelength is expected to continue to new standards being develop for higher capacity transceivers, for example the 400 Gbs Ethernet under discussion among companies and standards body. However, this increase in bandwidth per fiber, and the need to fill the fiber capacity, and cost of sparing these modules has disadvantages described above. For example, for a dense WDM network where many channels are to be transmitted on a single fiber, these different modules are combined to load a fiber with as high a capacity as possible. If a module fails, then an identical module must be available as a spare, requiring many spare modules. Thus, the expense of upkeep of the system is increased with the number of spare modules. Also populating the fixed grid requires purchasing and installing the specific module for that planned to be used sub-band. Fixed wavelength modules also make it difficult to migrate from a certain channel grid (e.g. 100 GHz) to a new grid (50 GHz or 37.5 GHz for example). New modules must be purchased and installed, that either replace all modules with a new grid spacing, or are offset at the current grid spacing, and as known to one skilled in the art, interleaved with existing channels to create a new finer channel spacing (e.g. 100 GHz to 50 GHz). Thus, migrating from one channel grid to another is expensive in terms of labor and parts. Moving to flexible grid makes the issue even more complicated and costly as special modules must be used for each modulation format portion of the spectrum and these modules then combined (for example a superchannel set of modules combined with modules that transmit 100 G Ethernet or 400 G Ethernet).

Other needs for tunable arrayed transceiver modules, with each channel independently tunable, are to address a broader set of use cases for fiber optic communications and networks. For example, an array of 10 independently tunable transmitter inside an arrayed transceiver can be used to support 10 individual 10 Gbps transmission channels with each channel tunable to an available wavelength on the fiber. In addition to this flexibility, it is possible to package more channels in an arrayed transceiver than with individual packages, and using individually tunable channels within the array yields the same function as having separate tunable transceivers. This is a very important advance in the state of the art, as optical transceiver density is one of the main limitations to today's fiber systems.

Accordingly, there is a need for technology that allows for interchangeability between the components in an arrayed module such that the entire module need not be replaced when a component within the module fails. There is also a need for a technology which is adaptable to new channel grids without replacement of all modules and, in particular, adaptable to a flexible grid without replacement of all or substantially all the existing modules in the grid. Lastly, there is a need for modules that have the flexibility to serve multiple use cases, where the group of wavelengths inside the arrayed transceiver can be utilized as a single group of aggregate data, such as the case of the standardized 100 Gbps over 10×10 Gbps WDM channels, or using the channels individually in a higher density package.

SUMMARY

According to the present invention, there are provided systems and apparatus that overcome the above-described limitations of known arrayed optical systems/subsystems, such as arrayed transceivers and transponder modules.

Tranceivers are used to transport data between electrical subsystems and systems over optical fibers by communicating data and information between electronic circuits and optical transmitters/receivers. WDM transceiver arrays are an attractive way to build networks since lower bit rate, commodity low cost transceiver technology can be used to transmit over each of the different wavelengths with the aggregate bit rate out of the WDM transceiver array higher than that of the individual components and lower cost than achieving the aggregate rate using higher speed technology until the next higher speed technology is deployed in volume at which arrays with higher bit rate per channel are then cost effective.

According to one embodiment of the present invention, there is provided a module for data communication having a plurality of wavelength tunable submodules, where each wavelength tunable submodule has a tunable laser and a device, system or subassembly for locking the tunable laser to a selected wavelength, such as a wavelength locker. The wavelength tunable submodules can be arrayed for use in wavelength division multiplexed (WDM) fiber optic communications, and in particular, WDM systems built out of arrays of individual transceivers each operating at a different wavelength, as well as flexible grid applications.

According to one embodiment, the module comprises a control circuit and first and second wavelength tunable submodules in electrical connection with the control circuit, the first and second wavelength tunable submodules comprising a tunable laser and a device, system or subassembly for locking the tunable laser to first selected wavelength. Preferably, the first wavelength tunable submodule and the second wavelength tunable submodule are each individually programmable to operate at a first selected wavelength and a second selected wavelength, the first and second selected wavelengths being the same or different. The first and/or second wavelength tunable submodules can be a photonic integrated wavelength tunable laser, also having electronics to set and control the wavelength tunable laser in the first and/or second wavelength tunable submodules at the selected wavelength. In other preferred embodiments, the first and/or second wavelength tunable submodule can be sized and include control circuitry which is compatible with a standardized form factor, and can also be removably connected to the control circuit and be interchangeable with other submodules according to the invention.

According to the invention, the module can also include components, such as transmitter components and/or subassemblies for receiving first and second (or a plurality) of input electronic signal and, converting the input electronic signals to output optical signals, and transmitting the output optical signals, and receiver components and/or subassemblies for converting input optical signals to output electronic signals and transmitting the output electronic signals. In addition, the module can also include a wavelength signal combiner device, and/or combination signal combiner and splitter device, coupled to the first and second (or plurality) of wavelength tunable submodules or other combining device including a wavelength multiplexer, a cyclic wavelength multiplexer or a waveband multiplexer. The signal combiner or multiplexer device can be positioned in the interior of the module housing, or exterior to the module housing.

According to another embodiment, a system for optical communication using a plurality of wavelength tunable submodule arrays is provided. The system includes a reconfigurable add/drop multiplexer and first and second modules coupled to the reconfigurable add/drop multiplexer. The first and second modules each have control circuits, and a first plurality of wavelength tunable submodules in electrical connection with the control circuit in each module. Each wavelength tunable submodule has tunable laser and a device, system or subassembly for locking the tunable laser to a selected wavelength, as described herein, and each wavelength tunable submodule is individually programmable to operate at a selected wavelength, the selected wavelength of each wavelength tunable submodule being tunable to the same wavelength or a different wavelength as each of the other of the plurality of wavelength tunable submodules.

According to another embodiment, a system for data communication using a wavelength tunable submodule array is provided. The system has a chipset, which may be a single chipset, or a plurality of individual chipsets, or a combination and a module which has a plurality of wavelength tunable submodules in electrical connection with the chipset. The plurality of wavelength tunable submodules operate as parallel transceivers, independent transceivers, or a combination thereof. A control circuit is positioned in the module in electrical connection with the wavelength tunable submodules, and each wavelength tunable submodule is individually programmable to operate at a selected wavelength, the selected wavelength of each wavelength tunable submodule being tunable to the same wavelength or a different wavelength as each of the other of the plurality of wavelength tunable submodules. A signal combiner device is coupled to the plurality of wavelength tunable submodules for signal output.

According to another embodiment, the array of wavelength tunable transceiver submodules is integrated at multiple levels, including one or more tunable transmitter submodules integrated on a single chip, arrays of tunable transmitter or transceiver submodules integrated with wavelength combining or multiplexing devices on a single chip, and each integrated array acting as a larger submodule that is then grouped with other arrayed submodules into the final module array. In the present embodiment, other electronic and optoelectronic functions can be integrated into similar arrays and group as submodules or among submodules in the final arrayed transceiver.

FIGURES

These and other features, aspects and advantages of the present invention will become better understood from the following description, appended claims, and accompanying figures where:

FIG. 1A illustrates a plurality of wavelength tunable submodules in an arrayed module according to one embodiment of the invention FIG. 1B illustrates an example of the arrayed module shown in FIG. 1A, shown in a housing;

FIG. 1C is an expanded view of the wavelength tunable submodule shown in FIG. 1A;

FIG. 1D is an exemplary wavelength tunable submodule, as shown in FIGS. 1A and 1C, shown by example as an SFP+ package;

FIGS. 3A and 3B illustrate another embodiment of the invention where the output wavelengths of the individual submodules are combined into channels;

DESCRIPTION

Figure 2A:
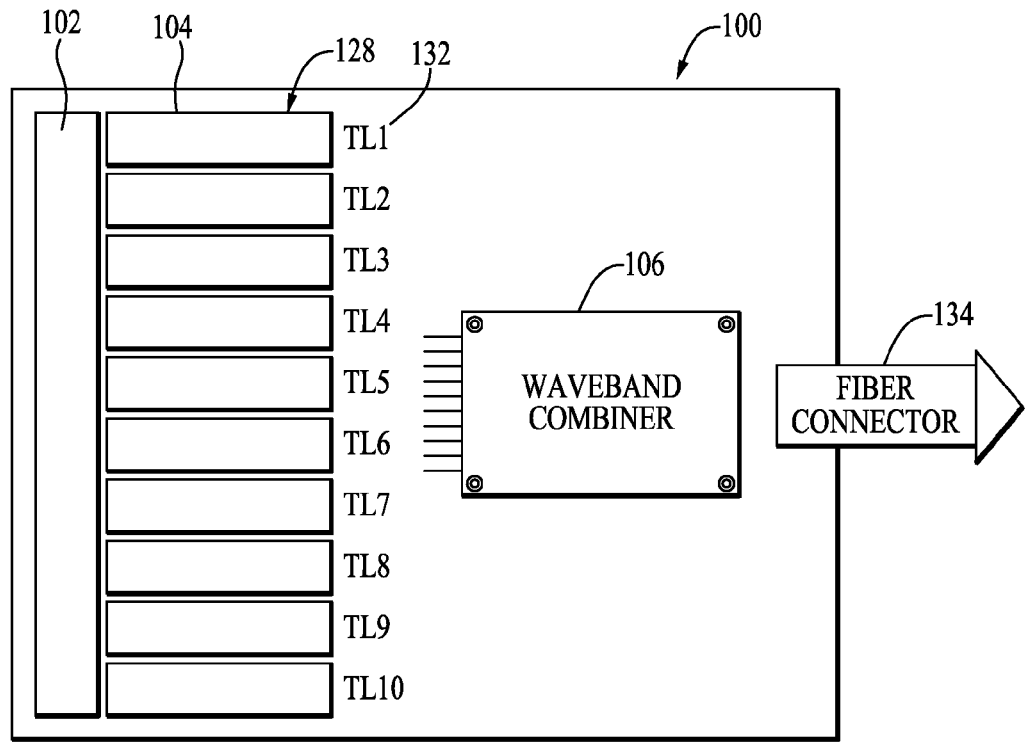
FIG. 2A illustrates another embodiment of the invention shown in FIG. 1A, where the output signal is communicated to a fiber connected output.

According to the present invention, systems and devices which overcome the disadvantages of known arrayed optical transceivers and transponder modules are provided. In one embodiment, wavelength tunable submodules for use in arrayed transponders and optical systems are provided. Each wavelength tunable submodule has a tunable laser and a device or system for locking the tunable laser to a selected wavelength. Each wavelength tunable submodule comprises a fully function individual unit having a tunable laser and self-contained wavelength locker that comprises optics, optoelectronics and locking circuitry to lock that laser (transponder) to the desired optical channel. In some embodiments, the individual wavelength tunable submodules comprise photonic integrated wavelength tunable lasers with integrated modulators. Other auxiliary functions that may be incorporated into the submodule include semiconductor optical amplifiers (SOAs), photodetectors, splitters, taps, mode converters, etc. and necessary electronics to set and control the desired wavelength and other parameters (e.g., temperature, etc.) of the module are assembled as individual units into an array form factor. Each wavelength tunable submodule/module that is incorporated into the arrayed transponder form factor, can have the same or different optical wavelength locking specifications (e.g. channel spacing) and other parameters including but not limited to modulation format.

As each wavelength tunable submodule is interchangeable and individually programmable to operate at a same or different selected wavelength, the submodules can be used in an arrayed module which can be used as the basic building block to fill all the wavelengths on a transmission fiber. Accordingly, an advantage of the present invention is that it is not necessary to have individual arrayed modules dedicated to wavelength sub-bands. This approach alleviates problems with non-tunable wavelength arrays like sparing issues. The wavelength tunable submodule/modules of the invention also enable more flexibilty in engineering the transmission channel thereby lowering the cost of designing and deploying high capacity fiber optic transmission links, as the submodules/modules of the invention are adaptable to new channel grids without replacement of all the modules.

There are other advantages that can be appreciated by one skilled in the art, for example using the same building block (i.e., the single channel wavelength tunable submodule with locker) replicated N times for an arrayed module (e.g. 10 times for 10×10 Gpbs for 100 Gbps CFP, 4 times for 4×10 Gbps 40 Gbps QSFP+, 4 times for a coherent 4×25 Gbps for a 100 Gbps CFP/2 or CFP/4 100 Gbps transceiver, etc.) lowers the cost in manufacturing, lowers the cost in having to test only one part prior to installing in the arrayed module, increases volume of the basic element (the single channel wavelength transponder) that can be used in single channel and any form factor arrayed module across a wide variety of applications and architectures lowers the cost of the technology, having prior tested individual same building block wavelength tunable, wavelength locked modules increase the yield of the fully assembled arrayed transmitter.

There are other aspects and advantages of the present invention. The wavelength tunable submodules, inside an array form factor, are able to be programmed and run at a desired locked wavelength independent of the other cards and control signal input/output (I/O) and other signals interfacing to the array module (e.g. CFP). According to the invention there is a master control circuit between the outside that handles communications standards for controlling the arrayed transceiver, communicating data and other functions. This master control circuit in this invention can also be used to poll the status of the transceiver submodules, and can act as a watch-dog processor to build fault tolerance and redundancy into the module. One skilled in the art can appreciate the case where the interface has a fault or one of the sub-cards (wavelength tunable submodules) has a fault. According to the present invention, the individual transceiver submodules are able to fully operate at the desired locked wavelength in the presence of faults elsewhere in the arrayed module.

According to other aspects of the present invention, independent tunable channels are incorporated within the arrayed transceiver submodules, with programming circuitry in the module or arrayed transceiver submodules to choose how the tunable wavelengths communicate with the data communication devices and systems on the electrical side. For example, in one embodiment, 10×10 Gbps channels are aggregated into a single logical 100 Gbps Ethernet channel over the tunable WDM channels. This embodiment can be organized on contiguous wavelength representing a group, or can be organized over any available set of 10 wavelengths by programming each wavelength to the available ones on the fiber, therefore utilize what might otherwise be stranded fiber bandwidth. The electronic data system can also use the channels in the module independently, each tuned to a desired, available or planned wavelength for the fiber, realizing a higher density transceiver than using 10 independent fixed or wavelength tunable transceivers. The advantages of having a tunable array that allows access to each channel independently include accessing available channels on the fiber with data generated on the client electrical side, whereas for fixed wavelength arrays, only the fixed wavelength is available. Another advantage is that on the client side, wavelengths in the array can be bundled together for a variety of application, including but not limited to, 40 Gbps WDM Ethernet, aggregation of traffic for routing a logic channel or path over a sub group of wavelengths, and increasing the density of transceiver form factor by incorporating an array of transceivers in a smaller industry standard package (e.g. CFP, CFP2 or other package) than would otherwise be the case if the transceivers were in stand-alone units like the SFP+.

The use of tunable laser sub-assemblies that are fully functional (i.e. are the same as that used as a single channel in a one channel module like an SFP+) allows the lock grid to be designed for a particular application. For example, the wavelength locker subassemblies can be chosen for a flexible grid application (e.g. 37.5 GHz, 12.5 GHz) thereby enabling the new flex grid standards to be realized using multiples of the same tunable wavelength arrayed transceivers described in this invention. In one implementation, the channels within an arrayed module can be tuned modulo the size of the module (e.g. 10 channels modulo 10) and a waveband combiner incorporated within the module or outside the module such that tuning one module to wavelengths 1-10, 11-20, etc. will all be multiplexed onto a single fiber by the same modulo 10 cyclic multiplexer. In the case of flexible grid, for example superchannel, a flexible grid ROADM can be interfaced inside or outside the tunable arrayed module to fill that portion of the spectrum that is flex-grid where all modules are the same tunable modules each tuned to a different portion of the flex grid. The same tunable modules with the same or different lockers can be used to fill other portions of the spectrum with fixed grid transport formats like 100 Gigabit Ethernet and 400 Gigabit Ethernet. All can be combined onto a single fiber yielding a very high efficiency of the fiber capacity. The same tunable array transceiver module design can be used to fill the whole fiber with any combination of fixed and flexible grid wavelength transmission.

According to other embodiments of the present invention, sub-groups of tunable lasers are integrated with optical combiner or multiplexer functions, tunable transceiver arrays, arrayed electronics and other functions. The sub-groups of tunable lasers are integrated into sub-arrays, where each form a subassembly is combined with other integrated tunable array subassemblies into a tunable array transceiver module.

Referring now to FIGS. 1A and 1B, a module 100 for data communication is shown. The module 100 comprises a control circuit 102 and plurality of wavelength tunable submodules 104 in an array. The wavelength tunable submodules 104 each comprise a tunable laser (not shown) and a wavelength locking device (not shown) for locking the tunable laser to a selected wavelength. The wavelength tunable submodules 104 are in electrical connection with the control circuit 102. Each wavelength tunable submodule 104 is individually programmable to operate at a selected wavelength, where the selected wavelengths of each wavelength tunable submodule 104 is the same or different. As also shown in FIG. 1A, the module 100 may also have a signal combiner device 106 to combine the wavelengths or wavebands of the output signals from the multiple wavelength tunable submodules 104.

Referring now to the invention in more detail, as shown in FIG. 1D, the wavelength tunable submodule 104 is shown as a single channel wavelength tunable module 108, shown by way of example in FIG. 1D, as an SFP+ package. However, as will be understood by those of skill in the art, this module 108, sometimes referred to as form factor, can be any pluggable transponder standard (e.g., XFP).

An illustration of the interior components of the wavelength tunable submodule 104, 108 is shown in FIG. 1C. As shown in FIG. 1C, inside the wavelength tunable submodule 104, 108 are various submodule components and subassemblies to realize the function of a transceiver that converts data between electrical and optical. These submodule components and subassemblies 110 include but are not limited to submodule circuitry 112, such as digital and analog circuits, circuit cards and connectors 114, tunable transmitter drive interfaces and connections 116, receiver interfaces and connections 118, transmitter subassemblies, such as a Transmitter Optical Subassembly (TOSA) 120, and receiver subassemblies, such as a Receiver Optical Subassembly (ROSA) 122. The wavelength tunable TOSA 120 contains devices and electronics (not shown) including but not limited to a tunable laser, external modulator, optical amplifier, electronic connections to the laser, and modulator and amplifier drive electronics including electronics used for setting and controlling the tunable laser. These devices and electronics can sit inside the TOSA 120, on the circuit card 114 and interface 116 and may be distributed between any portion of these. Also included in the submodule 104, 108 is a wavelength locker assembly (not shown). The wavelength locker assembly that is used to tune the wavelength a selected (desired) wavelength, such as those wavelengths on an International Standards wavelength grid. The ROSA 122 may include a components that convert the optical signal to an electronic signal, such as a photodetector (not shown) and electronics to convert the detected signal to be converted to an electronic voltage, amplifiers electronics and other electronics and/or optics used to recover the data and clock from the incoming signal, such as, but not limited to a transimpedance amplifier and/or other components and electronics. The TOSA 120 and ROSA 122 also contain optical connections to enable an optical fiber to be connected as input and output fibers for the transceiver module. In addition to the components, subassemblies, and electronics discussed herein, other components, subassemblies and electronics may be included in the TOSA 120 and ROSA 122 to perform other functions, not listed herein, as will be understood by those of skill in the art.

Referring again to FIG. 1A and FIG. 1B, an embodiment the invention is to replicate the building blocks for an individual wavelength tunable submodule 104 and its underlying components to transmit data on a wavelength that can be tuned. According to this embodiment, a module 100 for optical communication having a wavelength tunable submodule array 124 is provided. The module comprises a module housing 126 and a control circuit 102 positioned within the module housing 126. A plurality of wavelength tunable submodules 104 are positioned in electrical connection via the control circuit 102 and submodule components and subassemblies 110. Each wavelength tunable submodule 104 has a tunable laser (not shown) and a device, system or subassembly for locking the tunable laser (not shown) to a selected wavelength (TL). Each wavelength tunable submodule 104 is individually programmable to operate at a selected wavelength, the selected wavelength of each wavelength tunable submodule 104 is individually tunable to the same wavelength ($TL_1$) or a different wavelength ($TL_2$) from each of the other of the plurality of wavelength tunable submodules 104 in the wavelength tunable submodule array 124. The module 100 also has a signal combiner device coupled to each of the plurality of wavelength tunable submodules 104 in the wavelength tunable submodule array 124.

According to the invention, the individual card 114, submodule circuitry 112, transmitter and receiver interfaces 116, 118, TOSA 120 and ROSA 122 are replicated a number of N times (for example 10, as shown in FIG. 1A) into an arrayed module 100. For example, the CFP form factor contains 10 channels that each transmit and receive at 10 Gigabits per second for an aggregate of 100 Gigabits per second (Gps). The arrayed module 100, for the purpose of this invention, contains replicated versions of the individual submodules 104, assembled into an array 124 to form the arrayed module 100. Additional interface control circuitry 130 at the control interface 128 are used to coordinate communication among the independent wavelength tunable submodules 104 and may contain additional data and control connections that interface to submodule circuitry 112 and electronics and circuit cards 114 that the arrayed module 100 is connected to. The optical signal inputs/outputs from the individual submodules 104 are combined with other optical signal inputs/outputs of other submodules 104 in the submodule array 124 using a variety of methods that will be familiar to one skilled in the art. One example is to combine the wavelengths from the multiple TOSA 120 outputs onto a single transmit fiber and combine the multiple ROSA 122 inputs from a single input using a signal combiner device 106 or other similar device.

The different methods to combine and split the optical/electronic signals, familiar to one skilled in the art include but are not limited to wavelength multiplexers/demultiplexers, waveband multiplexers/demultiplexers, power splitters/combiners, reconfigurable optical add/drop multiplexers (ROAMS) and combinations of these devices and subassemblies and other techniques, as will be understood by those of skill in the art. According to one embodiment, the signal combiner device 106 is a combination signal combiner and splitter device that (i) selects one or both of the first and second output optical signals and forwards the selected output optical signals to one or a plurality of channels; and (2) selects a single input signal that carries a plurality of channels and separates the single input signal into first and second input optical signals.

Referring again to FIG. 1, the individual wavelength tunable submodules 104, which are replicated in the arrayed module 124, N times, may be smaller in form factor to fit inside the module 100 that is large in size. The wavelength tunable submodules 104 connect electrically to the arrayed module input/output interface 128 using connectors, ribbons, board mounted sockets or other technique familiar to one skilled in the art. These connections between the wavelength tunable submodules 104 and the arrayed module input/output circuit card 130 are on the order of the same dimension as at least a portion of the wavelength tunable submodule array 124. The signal combiner device 106 (e.g., wavelength or waveband combining/splitting or similar component) may also fit inside the module housing 126 if used along with optical connections between the wavelength combiner type device 106 and a front panel of the arrayed module 100. An output connector is dimensioned such that its footprint and dimension is smaller than the surface (typically the front of the module but not necessarily so) of the arrayed module housing.

The construction details of the embodiment of the invention shown in FIG. 1 are to assemble the individual cards using an appropriate circuit board material to support DC and AC signals at the data rates supported by the submodules 108 and modules 100 and to support the component connections for the various circuits 112, as will be understood by those of skill in the art. Using one or more circuit cards 114 or layers per circuit card, like multilayer cards, through vias, etc., the TOSA 120 and ROSA 122 are connected to the main circuit card 114 (which may be multiple cards) using methods known in the art, for example using a ribbon connector. The individual submodules 108 may then be replicated using fabrication processes that act to maximize yield, minimize cost, meet performance specifications and result in yielded tested sub-modules identical or like those used in the submodule array 124 to form the multiplicity of tunable wavelength channels in the arrayed module 100. The connection of the submodules 104 within the arrayed module 100 can be achieved by components and methods known in the art. As shown by way of example in FIG. 1, the submodule 104 is connected to a module mothercard or circuit card 102 and interface control circuitry 130. The control circuit 102 comprises interface control circuitry 130 which interfaces communications among the submodules 104 in the submodule array 124 and each of the independent tunable wavelengths (TL) of the submodules 104. In some embodiments, the control circuit and card 103 comprises one or more of FPGA circuitry, a watchdog processor and other functions as will be understood by those of skill in the art. The control circuitry located on the mothercard 102 facilitates both standardized and nonstandardized communications between external electronics (not shown) or optics and the module 100 via the interface 128 and interface control circuitry 130. In one embodiment, the interface 128 is a CFP standard host data and control interface.

The submodule array 124 is connected to, and in signal communication with the signal combiner 106 to communicate data to and from the individual submodules 104 for data communication (e.g., transmission) over optical fiber (not shown) connected to the module 100. The signal combiner 106 further communicate data received by the module 100 by the individual submodules 104 to electronics or any other entities that the array module 100 communicates to over the data path communicated over the interface 128.

As is also illustrated in FIG. 1, the signal combiner device 106 is a wavelength/waveband combiner and/or splitting element that can be used to merge the data modulated by each of the submodules 104 onto a single fiber or multiple fibers connected to the output of module 100. The signal combiner device 106 may be a wavelength combiner, or other component including but not limited to an optical power combiner, waveband combiner, and/or cyclic wavelength combiner. In other embodiments, the module 100 does not have a signal combiner device 106. Instead, the output signals from the submodules 104 are connected to or communicated directly to a connector at the front of the arrayed module 100. Also known to one skilled in the art, in addition to the combiner like device 106 there may also be a splitter or demultiplexer equivalent device (not shown) that communicates signal inputs to the module 100 via input optical fibers and received by the ROSA 122 units on each submodule 104. In other embodiments, the device 106 is a wavelength/waveband combiner that will, for example, combine a plurality of wavelengths or wavelength sub-groups, e.g., wavelengths 1-10 and 11-20 and 21-30, etc. without the loss of a passive combiner.

According to other embodiments of the invention, any sub-portion of the optical and/or electronic circuitry on the module 100 may be implemented in integrated array format to create sub-arrays of submodules 104, where the sub-arrays of submodules, themselves, function as a module array.

Figure 2B:
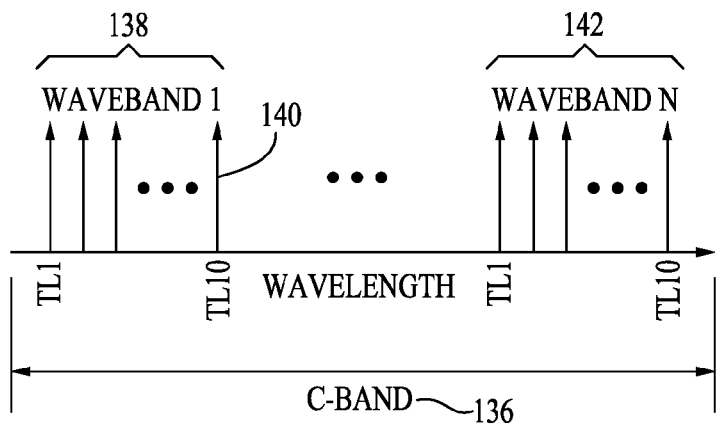
FIG. 2B illustrates wavebands in the C-band, which can be filled with the submodules and combiner shown in FIG. 2A, according to another embodiment of the invention.

Referring now to FIGS. 2A and 2B, other embodiment of the invention described above in reference to FIG. 1A are shown, where like numbers refer to like elements. As shown in FIG. 2A the output signal 132 (TL1-TL10) from the submodules 104 in the submodule array 124 is communicated to a fiber connected output 134. As will be understood by those of skill in the art, the invention described above in reference to FIG. 1 facilitates various methods and modes of communications over optical fibers. By incorporating various types of optical combining elements 106, the output 132 from the wavelength tunable submodules 104 can be communicated to the fiber connected output 134 where the output 134 may be one fiber, or a multiplicity of fibers. According to the invention, by incorporating individually tunable wavelength submodules 104, where each submodule 104 is tuned to a different or same wavelength 132, the module 100 can be used in a variety of ways for optical communications. For example, the module 100 can be used to communicate optical data by transmission via the fiber connected output 134, and/or optical data can be received by the optical fibers or a multiplicity of optical fibers via the fiber connect 134, through a variety of available methods, as known in the art.

According to another embodiment illustrated in FIG. 2B, a first module comprising the submodules 104, module 100, and signal combiner 106 can be used to fill wavebands in the C-band 136. According to this embodiment, optical signals can be communicated by the multiplicity of wavelengths 134 (TL1-TL10) carrying data generated by the submodules 104 by arranging the wavelength outputs from one module in consecutive wavelengths 132 located within a sub-band 138. The sub-band 138 contains the output wavelengths from the module 100 via the combiner 106 and fiber output 134. A second module comprising submodules 104, module 100 and signal combiner 106, can then be waveband multiplexed onto a single fiber where each first and second module 100 modulates data onto the fiber sub-band from waveband 138 to, for example, waveband N (1) with individual wavelengths 140 on the fiber coming from each of the submodules 104. One example is to use a waveband combiner that is cyclic in nature as is known to one skilled it the art such that tuning a group of submodules 104 to consecutive wavelengths 138 within a waveband 138, 142 allows the same waveband combiner 106 to be used within each tunable arrayed module 100 such that all modules 100 and wavebands (N+1) can fill the C-band, a range of optical wavelengths being known to those skilled in the art.

Figure 2C:
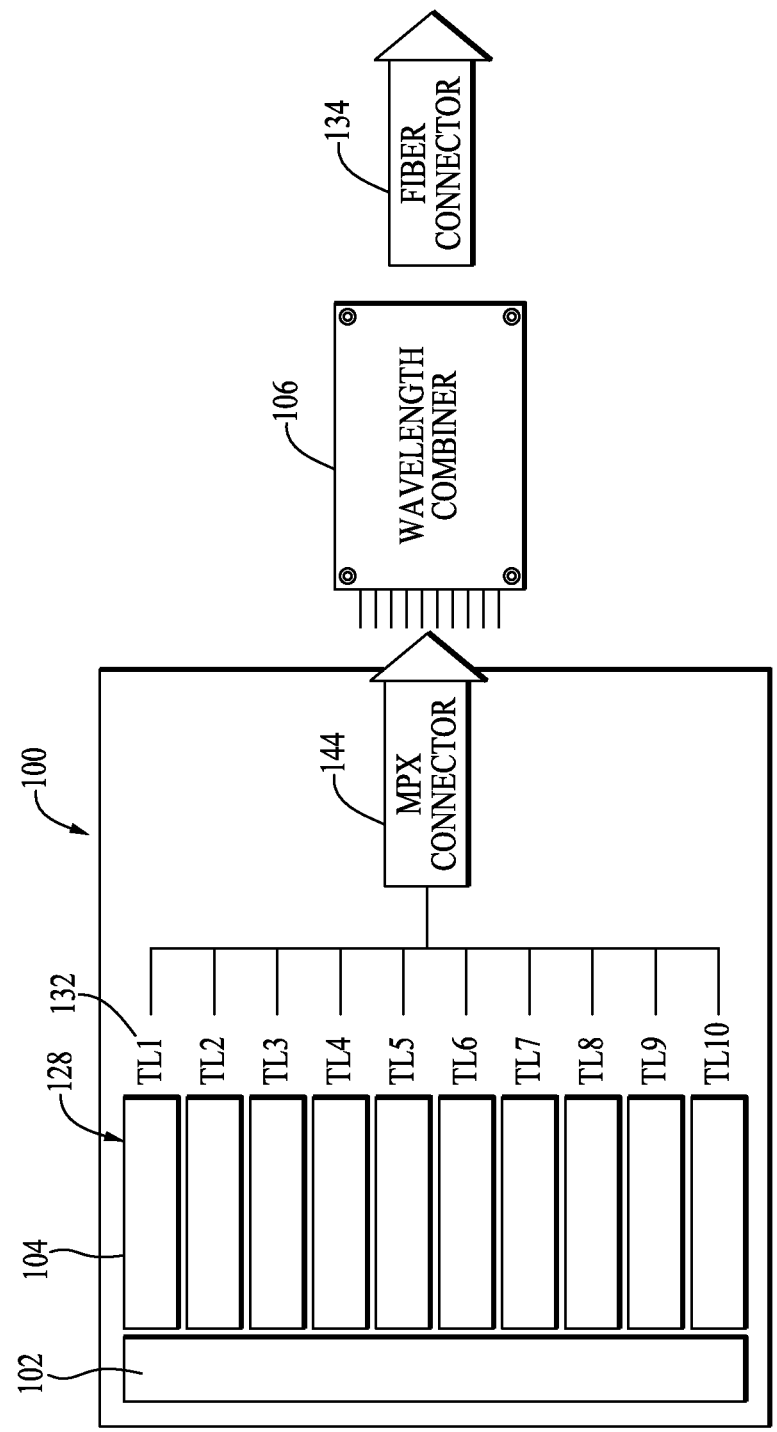
FIG. 2C illustrates another embodiment of the invention shown in FIG. 1A, where the combining element, which is also a splitting or demultiplexing element is outside the arrayed module.

FIG. 2C illustrates another embodiment of the invention shown in FIG. 1A, where the combining element 106, which is also a splitting or demultiplexing element is outside the module 100. As shown in FIG. 2, the signal combiner (e.g., waveband combiner) 106 is also a splitting or demultiplexing element and is positioned outside the arrayed module 100. The combiner 106 is connected to the submodules 104 by known connecting devices and methods. For example, the fiber output 144 is coupled, such as through a multi-fiber connector 146, (shown as an MPX connector) to form the same or similar final communication function to/from the optical fiber output 132 via the fiber connect 134, to the fiber or fiber transmission system, as the system shown in FIG. 2A. The example shown in FIG. 1 is known to those in the art as a fixed grid wavelength fiber application or communication system. The wavelength tunable submodules 104, packaged and organized into the arrayed module 100 allows a wide variety of uses including, but not limited to the fixed grid applications shown for illustrative purposes in FIGS. 2A-2C.

Referring now to FIGS. 3A and 3B, another embodiment of the invention is illustrated, where the output wavelengths 144 of the individual modules 100 are combined into channels, for example channels 148, 150, and 152 shown in FIG. 3B. As shown in FIG. 3A, a system for optical communication using a plurality of wavelength tunable submodules 104 coupled into a module array is shown. The system has a plurality of modules 100 (shown in FIG. 3A as modules 100*a*, 100*b*, and 100*c*, but greater numbers of modules can be used according to the invention) which are coupled to a reconfigurable add/drop multiplexer 154. Each module 100 has a control circuit 102, and a plurality of wavelength tunable submodules 104 in electrical connection with the control circuit 102, each wavelength tunable submodule 104 has a tunable laser and a device, system or subassembly for locking the tunable laser to a selected wavelength and is individually programmable to operate at a selected wavelength, the selected wavelength of each wavelength tunable submodule 104 being tunable to the same wavelength or a different wavelength as each of the other of the plurality of wavelength tunable submodules 104, as described herein with the reference to the preceding embodiments.

As illustrated in FIG. 3B, the fiber output 144 *a-c* of the individual submodules 104 are tuned to wavelengths 156 that are organized into other types of communications channels 148, 150, and 152, like a superchannel 148 known by one skilled in the art to have a high spectral efficiency where the wavelengths 156 are spaced at the data rate separation or closer depending on the type of superchannel 148 used for transmission. This transmission format, which can be transmitted and received using the submodules 104 and modules 100 according to present invention, can be combined with other channel formats. For example, the channel formats can include a fixed grid, for example a 400 Gigabits per second 150 or 100 Gigabits per channel 152 and combined all onto a single channel, known to one skilled in the art as a flexgrid.

The submodules 104 and plurality of arrayed modules 100 can be combined using a variety of techniques known to one skilled in the art and illustrated in FIG. 3A using a Flexible Grid ROADM 154 to organize via the module control 102 and multiple arrayed tunable modules 100, shown as 100*a*, 100*b* and 100*c* with each connected to the fiber combiner, ROADM or other flexgrid device and reverse device that splits apart the wavelengths 132 from the fiber transmission system or input fiber to the individual ROSA 122 optical to electrical converters located on the individual submodules 104. As shown by way of example in FIG. 3B, each tunable arrayed module 100 can be used to tune to a subgroup of wavelengths 158, 160, 162, 164. This configuration enables flexgrid communications over the fiber using arrayed tunable modules 100 that are each identical, or by several different types of wavelength tunable arrayed modules 100 if the optical bandwidth used is larger than that achievable with one type of module 100. However, other configurations are possible and can be designed and implemented according to the present invention, as will be understood by those of skill in the art.

Figure 4:
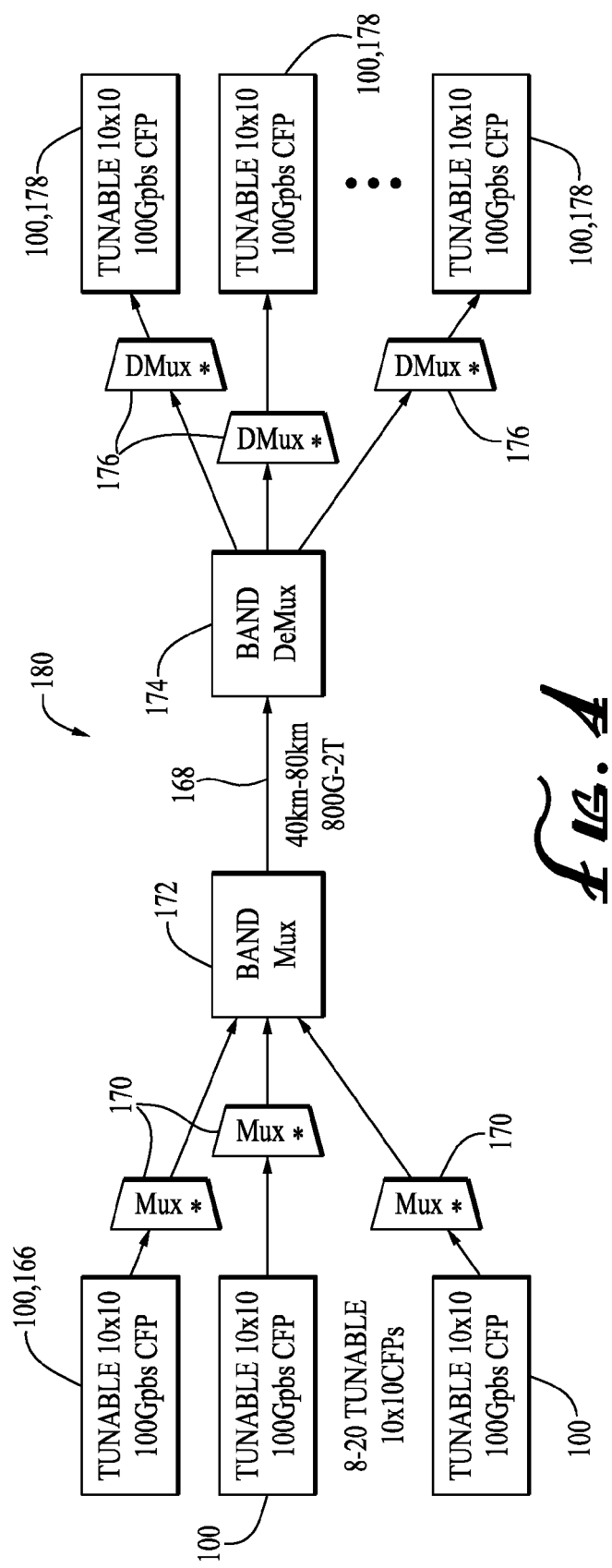
FIG. 4 illustrates an exemplary system using a plurality of wavelength tunable modules according to another embodiment of the invention.

Referring now to FIG. 4, an exemplary system using a plurality of wavelength tunable modules 100 according to another embodiment of the invention is illustrated. FIG. 4 shows a transmission system 180 using wavelength tunable arrayed transceiver modules 100 organized to fill the transmission fiber or transmission fibers 168 using a variety of techniques, components and subsystems 170, 172 that combine the wavelengths (not shown) from the tunable modules into a flexible or standard format to be transmitted over a fiber span or set of fiber spans 168. Employing the submodules 104 and modules 100 according to the present invention, in the transmission system 180 very high transmission capacities can be achieved, and conversely received, to a demultiplex flexgrid, or wavebands or other formats using devices or subsystems like a band demultiplexer 174 and through possibly other demuliplexing stages 176 to the fiber optic input ports of the same type of wavelength tunable modules 100, or other type of transponder module receiver inputs 178, as will be understood by those of skill in the art.

The advantages of the present invention include, without limitation, for example shown in FIG. 4 the use of wavelength, waveband or other combining or splitting elements (e.g., 170, 172) inside or outside the tunable arrayed module 100. The system shown in FIG. 4 can be used with fixed, flexible or mixed grid transmission formats and other devices and subsystems including, but not limited to, flexible grid reconfigurable optical multiplexers, or any combination of these. Other advantages include that identical CFP Modules can be used for each waveband and that the same wavelength tunable SFP+ like submodules can be used for each channel in an arrayed module form factor like a CFP, lowering the cost through volume scaling. Waveband engineering can be interleaved or bundle 50 GHz (or other fixed or variable channel spacing) that is afforded by using the present invention of wavelength tunable arrayed transceiver submodules and the use of a wavelength locker on each laser. In addition, the master CFP controller gives module setup redundancy and fault tolerance. Other grid spacing, than described herein, can be used, for example, lockers with e.g., 25 GHz, 10 GHz, mix and match in CFP, narrow locking with tunability supports coherent modulation formats, OFDM, and Superchannel, etc.; and/or arbitrary population of grid or portion of grid. An advantage of the present invention, in that each channel has its own locker –2.5 Ghz, 10 GHz, 25 GHz, 37.5 GHz, etc. is that the submodules and modules described herein can be combined in arbitrary ways to populate fiber grid with other transmitter modules, and that the flexible grid tunable modules of the invention can be combined with other flexible or fixed grid tunable modules to balance cost of loading a fiber, e.g., 10 G base channels, 25 G coherent or direct, etc. can be mixed and matched.

Figure 5A:
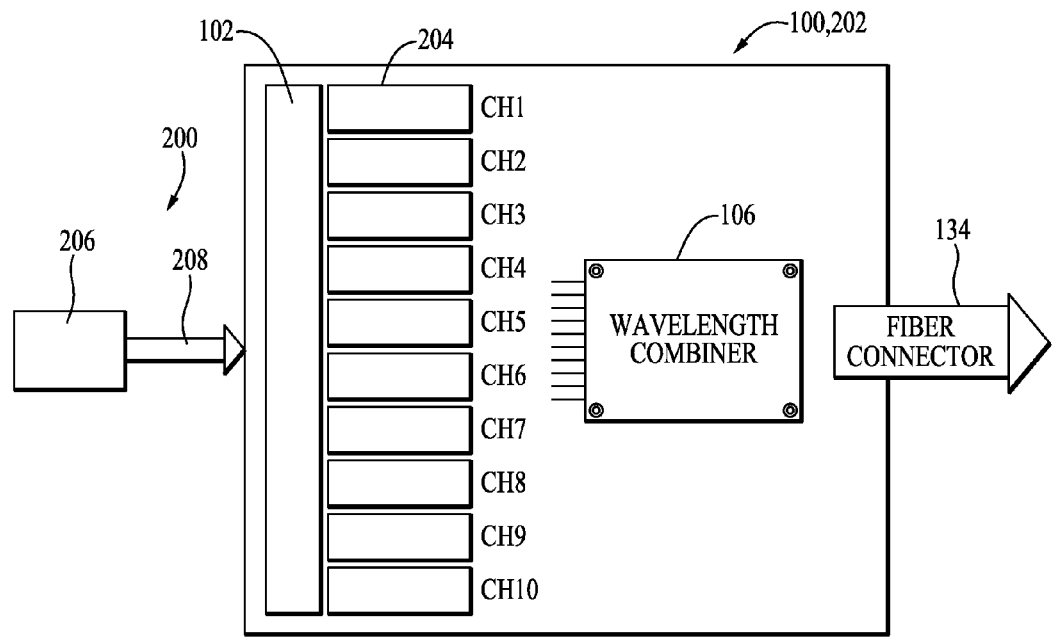
FIG. 5A and FIG. 5B illustrate systems for data communications incorporating the wavelength tunable submodules as parallel and/or independent transceivers according to another embodiment of the invention.
Figure 5B:
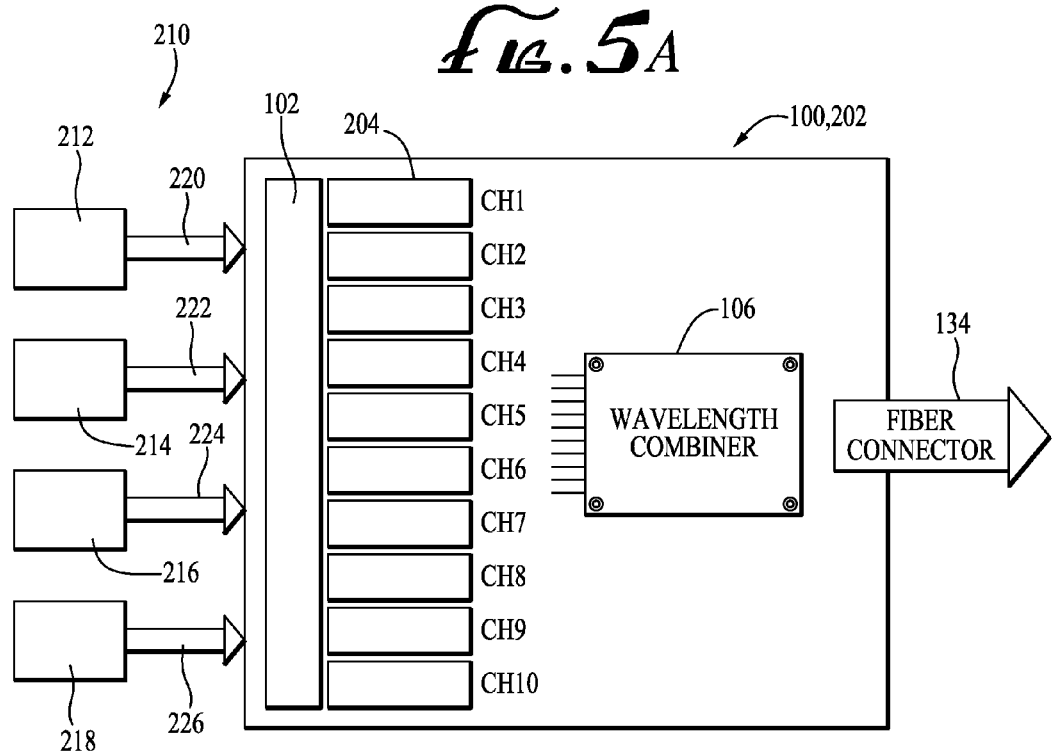

Referring now to FIG. 5A and FIG. 5B, a system for data communication 200 is shown, incorporating the wavelength tunable submodules 100 as parallel and/or independent transceivers according to another embodiment of the invention. As shown in FIG. 5A and FIG. 5B, the wavelength tunable array module 100 can be programmed to act as a transceiver 202, which can be a parallel transceiver, independent transceiver, or a mixture of both. Referring now to FIG. 5A, an example of a fully parallel case is shown, for example, the module 100 comprises a transceiver 202, which in this embodiment is a parallel transceiver. According to this embodiment, the transceiver 202 is a 100 G Ethernet transceiver consisting of 10 independent tunable channels (CH1-CH10) corresponding to 10 independent submodules 204. The transceiver 202 can be driven from a chipset 206 on the client side over electrical communication 208 to transmit using the parallel 100 G standard. In an alternate embodiment (not shown), individual chipsets (instead of the 100 G WDM chipset), each running at 10G can transmit over electrical communications to the transceivers 202 drive each channel (CH1-CH10) separately. This embodiment has the benefits of wavelength tunability of the transceiver submodules 204, but in a transceiver form factor of the module 202 that is standard (or non-standard) with a density greater than, and footprint less than, individual tunable transceiver modules, enabling the electrical client side to also connect to available wavelengths on the fiber using the tenability of each channel. The addition of programmable electronics such as FPGAs enables the arrayed transceiver to be reconfigured to support a wide variety of interconnection between the client side electronics and the fiber optic line side wavelength division multiplexed transmission.

Referring again to FIG. 5B, another embodiment of the module 100 which can be programmed to act as a transceiver 202, which is an independent transceiver, or a mixture of both a parallel transceiver and an independent transceiver is shown. According to the embodiment shown in FIG. 5B, a chipset 210 having plurality of individual chipsets, (212, 214, 216 and 218), which correspond to a subset of transmittable wavelengths is shown. The chipset 210, comprises a plurality of individual chipsets, such as chipsets (212, 214, 216 and 218), for example. As an example, FIG. 5B shows 4 individual chipsets, such as 212, a first 40 Gbps WDM chipset, 214 and 216, both 10 Gbps chipsets, and 218, a second 40 Gbps WDM chipset on the client side. However, the chipset 210 can comprise a broad range of combinations of individual chipsets, which correspond to a variety of subsets of tunable wavelengths, for example 4 if each are 10 Gbps, and the remaining wavelengths can be driven with independent or other parallel data sources and chipsets. The transceiver 202 and submodules are driven from the plurality of chipsets 210 on the client side over electrical communications (220, 222, 224 and 226) to transmit using parallel or individual wavelengths, which are tunable to correspond to different applications. As will be understood by those of skill in the art, the module 100, functioning as the transceiver 202, and the transceiver submodules 204 are tunable to a variety of N+1 channels, corresponding to one or a plurality of tunable wavelengths and corresponding plurality of individual chipsets 210 on the client side and corresponding to a plurality of wavelength supported in the fiber transmission system. The embodiments of the present invention are not limited to the examples given for 10 G per wavelength, but are scalable to other bit rates and data modulation formats. The present invention provides a greater degree of flexibility, higher transceiver density, and better economics than current state of the art. The transceiver form factor of the module 202 may be standard (or non-standard) with a density greater than and a footprint which less than having individual tunable transceiver modules.

The present invention can incorporate the devices and subassemblies described in U.S. application Ser. Nos. 12/945, 264; 12/945,470; 13/866,784; 61/671,756 and 61/748, 418, incorporated herein by reference in their entirety, and can also incorporate the use of one of a multiplicity of modulation formats of the optical signal that can be used, as is known to those of skill in the art, to take advantage of spectral efficiency, tolerance to fiber dispersion and nonlinearities and other degradations during fiber transmission. The modulation formats used in the arrayed tunable module 100 via the submodule components and subassemblies 110, the TOSA 122 and ROSA 124 and other functions on the submodules 104 can be one of many including but not limited to duo binary or dense WDM or OFDM, yielding for illustration purposes 800 G-1 THz per 8 modules, or in the illustrative case of 12.5 GHz grid (e.g., duo binary or back-end DSP for OFDM) or 125 GHz per 10 submodules 104 in and arrayed tunable module 100, can transport 2 TB—using 2.5 THz per 20 modules. These examples are given for illustration purposes only and the present invention can achieve a multiplicity of ways to load the fiber channel to yield a desired capacity, reach, signal to noise ratio or other required metric or set of metrics or standards as is evident to one skilled in the state of the art.

According to the present invention, a method and apparatus for organizing submodule transceivers 104, each tunable in wavelength, and incorporating a variety of functions is described. The submodules 104 can include functions including but not limited to data modulation, wavelength setting, locking a registration, optical data detection, data and clock recovery, and a variety of other necessary functions known to one skilled in the art. Advantages of the invention described herein are that the submodules 104, when organized into a tunable arrayed module 100 that offers a wide variety of flexible options to build and load the capacity of the fiber channel using a multiplicity of similar or same units to leverage advantages, also known to one skilled in the art without trading flexibility and improving cost, reliability and performance of the fiber link and its engineering and operations and management.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. And, although the present invention has been discussed in considerable detail with reference to certain preferred embodiments, other embodiments are possible. Therefore, the scope of the appended claims should not be limited to the description of preferred embodiments, methods, and examples contained herein.

What is claimed is:

1. A module for optical communication, the module comprising:
- a module housing;
- a control circuit disposed within the module housing;
- a plurality of wavelength tunable submodules disposed to form a wavelength tunable submodule array in electrical connection with the control circuit, each wavelength tunable submodule comprising a tunable laser and a device for locking the tunable laser to a selected wavelength, wherein each wavelength tunable submodule is interchangeable and individually programmable to operate at the selected wavelength, the selected wavelength of each wavelength tunable submodule being tunable to a different or same wavelength as each of the plurality of wavelength tunable submodules, and wherein the control circuit is configured to individually control the plurality of wavelength tunable submodules using two or more different control signals; and
- a signal combiner device coupled to the plurality of wavelength tunable submodules, wherein the plurality of wavelength tunable submodules is configured to operate as a parallel transceiver, independent transceiver, or a mixture of the parallel transceiver and independent transceiver.

2. The module for optical communication according to claim 1, wherein the signal combiner device is disposed inside the module housing.

3. The module for optical communication according to claim 1, wherein the signal combiner device is disposed outside the module housing.

4. The module for optical communication according to claim 1, wherein the signal combiner device comprises a signal combiner and splitter device.

5. The module for optical communication according to claim 1, wherein the plurality of wavelength tunable submodules comprises N+1 submodules, where N is an integer selected from 1, 3, or 9.

6. A system for optical communication using a plurality of wavelength tunable submodule arrays, the system comprising:
- a reconfigurable optical add/drop multiplexer;
- a first module coupled to the reconfigurable optical add/drop multiplexer, the first module comprising a first control circuit, and a first plurality of wavelength tunable submodules in electrical connection with the first control circuit, each wavelength tunable submodule of the first plurality comprising a tunable laser and a device, system or subassembly for locking the tunable laser to a selected wavelength, wherein each wavelength tunable submodule of the first plurality is interchangeable and individually programmable to operate at the selected wavelength, the selected wavelength of each wavelength tunable submodule of the first plurality being tunable to a different or same wavelength as each of the first plurality of wavelength tunable submodules, the first control circuit is configured to individually control the first plurality of wavelength tunable submodules using two or more different control signals, and the first plurality of wavelength tunable submodules is configured to operate as a parallel transceiver, independent transceiver, or a mixture of the parallel transceiver and independent transceiver; and
- a second module coupled to the reconfigurable add/drop multiplexer, the second module comprising a second control circuit, and a second plurality of wavelength tunable submodules in electrical connection with the second control circuit, each wavelength tunable submodule of the second plurality comprising a tunable laser and a device, system or subassembly for locking the tunable laser to a selected wavelength, wherein each wavelength tunable submodule of the second plurality is interchangeable and individually programmable to operate at the selected wavelength, the selected wavelength of each wavelength tunable submodule of the second plurality being tunable to a different or same wavelength as each of the second plurality of wavelength tunable submodules, the second control circuit is configured to individually control the second plurality of wavelength tunable submodules using two or more different control signals, and the second plurality of wavelength tunable submodules is configured to operate as a parallel transceiver, independent transceiver, or a mixture of the parallel transceiver and independent transceiver.

7. A system for data communication using a wavelength tunable submodule array, the system comprising:
- a chipset;
- a module comprising a plurality of wavelength tunable submodules in electrical connection with the chipset, and a control circuit in electrical connection with the plurality of wavelength tunable submodules, each wavelength tunable submodule comprising a tunable laser and a device, system or subassembly for locking the tunable laser to a selected wavelength, wherein each wavelength tunable submodule is interchangeable and individually programmable to operate at the selected wavelength, the selected wavelength of each wavelength tunable submodule being tunable to a different or same wavelength as each of the plurality of wavelength tunable submodules, and wherein the control circuit is configured to individually control the plurality of wavelength tunable submodules using two or more different control signals; and
- a signal combiner device coupled to the plurality of wavelength tunable submodules, wherein the plurality of wavelength tunable submodules is configured to operate as a parallel transceiver, independent transceiver, or a mixture of the parallel transceiver and independent transceiver.

8. The system according to claim 7, wherein the plurality of wavelength tunable submodules comprises a subgroup of multiple laser wavelengths.

9. The system according to claim 7, wherein the chipset comprises a plurality of chipsets.

10. The system according to claim 9, wherein the plurality of chipsets corresponds to a subgroup of multiple laser wavelengths transmitted by a corresponding subgroup of wavelength tunable submodules.

11. The module for optical communication according to claim 1, wherein the signal combiner comprises a flexgrid including different types of channel formats combined onto a signal channel.

12. The module for optical communication according to claim 11, wherein the signal combiner is configured to support a superchannel.

* * * * *